United States Patent [19]
Donne

[11] 3,799,654
[45] Mar. 26, 1974

[54] OPTICAL INTERFERENCE FILTER HAVING AN INTERMEDIATE ENERGY ABSORBING LAYER

[75] Inventor: Werner Donne, Alvsjo, Sweden

[73] Assignee: LKB-Produkter AB, Bromma, Sweden

[22] Filed: Feb. 17, 1972

[21] Appl. No.: 227,158

[30] Foreign Application Priority Data
Mar. 2, 1971 Sweden.............................. 2636/71

[52] U.S. Cl..................................... 350/166, 350/1
[51] Int. Cl. ............................................ G02b 5/28
[58] Field of Search....................... 350/1, 163–166; 356/112; 333/98 M, 83 A

[56] References Cited
UNITED STATES PATENTS

| | | |
|---|---|---|
| 3,556,640 | 1/1971 | Austin.................................. 350/164 |
| 3,521,961 | 7/1970 | Heidenhain et al.................. 350/164 |
| 3,548,348 | 12/1970 | Gerdine........................... 333/98 M |
| 2,639,327 | 5/1953 | Heller .............................. 333/83 A |

Primary Examiner—Ronald J. Stern

[57] ABSTRACT

An optical interference filter, comprising two parallel transmitting and reflecting surfaces arranged at a distance from each other, which is a multiple of half the transmitted wavelength, at least one energy absorbing layer being located between the surfaces at a distance from the surfaces which is a multiple of half the transmitted wavelength.

1 Claim, 1 Drawing Figure

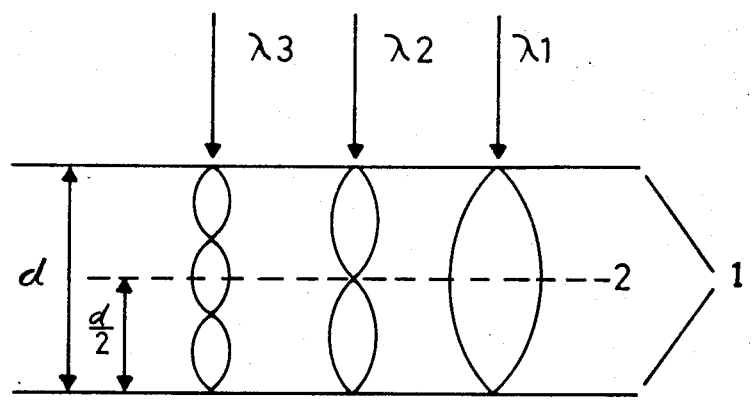

OPTICAL INTERFERENCE FILTER HAVING AN INTERMEDIATE ENERGY ABSORBING LAYER

An optical interference filter could be formed by arranging two semitransparent mirrors in parallel at a certain distance from each other. Light impinging on the outer surface of one of these mirrors will give rise to standing waves between the mirrors provided that the distance between the mirrors is a multiple of half the wavelength of the light, this light then being transmitted through both mirrors. The arrangement will thus form a resonant filter having a number of transmission peaks for light waves having these properties. Usually one is, however, only interested in obtaining one or some of these peaks which means that the remaining peaks have to be supressed, which is usually made by means of a second filter, consisting e.g. of a coloured glass plate arranged after the interference filter in the transmission path. If one is interested in obtaining a transmission only for waves within the visible wavelength range, this suppression of not wanted frequencies is usually easily dealt with. However, if the wavelength range of interest is within the ultraviolet frequency range, it is often a very difficult problem to suppress undesired wavelengths. One method of solving this problem consists in arranging a number of interference filters of the above described type in series, and to have different distances between the mirrors of the different filters so as to suppress different peaks in different filters. However, in such a system of parallel mirrors one will always obtain transmission peaks for wavelengths which are resonant in at least one of the filters and are not fully suppressed by others, i.e. wavelengths for which the distance between two subsequent mirrors is an even multiple of one quarter of the wavelength, whereas no such distance is equal to an odd multiple of the quarter wavelength.

It is an object of the present invention to provide an interference filter comprising two parallel mirrors in which undesirable transmission peaks are suppressed. The characteristics of the invention will appear from the claim following the specification.

The invention will now be explained in detail, reference being made to the enclosed drawing, which schematically shows a filter according to the invention.

In the drawing reference 1 denotes two mirrors having a certain transmission, the mirrors being arranged in parallel at the distance $d$ from each other. The mirrors could for instance consist of multi-layer dielectric coatings separated by a spacer element, for instance made of solid glass according to the conventional principle of making interference filters. Light impinging towards one of the mirrors (the upper mirror according to the drawing) will then give rise to standing waves between the mirrors, provided that the distance $d$ is an even multiple of half the light wavelength. Light of other wavelengths will be suppressed and will not pass through both the mirrors. In the drawing the symbols $\lambda_1$, $\lambda_2$, and $\lambda_3$ denote light having the wavelengths $2d$, $d$ and $\frac{2}{3}d$. The standing waves of these wavelengths are indicated between the mirrors. It is obvious from the drawing that all frequencies having a half wavelength that is a multiple of the distance $d$, will be transmitted through the filter. It should also be noted that the hitherto described arrangement is known per se.

According to the invention a light absorbing layer 2 is introduced between the mirrors. This layer which should have no transmitting or reflecting properties and could e.g. consist of chromium. In order to give this layer basically absorbing and not reflecting properties the layer is applied by vaporization technique and is made very thin, preferably less than 10A. Such a thin layer will be heterogeneous and give rise to a heavy diffusion of impinging light, the light energy thus being absorbed in the layer and transformed to heat. According to the example the layer is introduced at the distance $d/2$ from the mirrors. At this level the waves $\lambda_1$ and $\lambda_3$ have a loop and since the layer is absorbing these wavelengths will be extinguished. Light having the wavelength $d$ as well as light for which the distance $d/2$ is a multiple of the wavelength will, however, have a node at the absorbing layer and will consequently pass through the filter. A corresponding effect could be achieved by introducing a reflecting layer where according to the invention the absorbing layer is introduced, thus obtaining a two-stage interference filter having a pass-band for the wavelength $d$. Theoretical calculations and practical experience do, however, prove that the band width of the transmission peaks of an interference filter decreases as the number of loops between the reflecting surfaces of the mirrors increases. Thus one is interested to use a wavelength having a high number of nodes and loops between the filter. By introducing the absorbing layer it will be possible to suppress an arbitrary number of light waves, having lower frequencies than the frequency to be transmitted as well as higher frequencies lower than twice the transmitted frequency. If for instance the layer is situated at the distance $d/4$ from one of the mirrors, all wavelengths shown in the FIGURE will be suppressed, only the wavelength $d/2$ and a number of higher multiple frequencies being fully transmitted through the filter. The suppression of the wavelengths $\lambda_1$ and $\lambda_3$ will, however, be incomplete, since the layer will not be situated at a middle of a loop of these waves. A complete suppression of these wavelengths could, however, be obtained by a layer at the distance $d/2$ from the mirrors as shown in the FIGURE. It is also realized from the FIGURE that an arbitrary number of lower frequencies could always be completely suppressed by introducing a sufficient number of absorbing layers between the mirrors and thus an arbitrary narrow bandwidth of the transmitted frequency could be achieved.

We claim:

1. An optical interference filter, comprising two parallel partially reflecting surfaces arranged at a distance from each other, which is a multiple of half the transmitted wavelength, characterized in, that at least one predominantly energy absorbing layer is located between, and parallel to, the partially reflecting surfaces at a distance from each surface which is a multiple of half the transmitted wavelength.

* * * * *